Sept. 7, 1948.  C. A. ARENS  2,448,696
CONTROL UNIT
Filed May 17, 1943  2 Sheets-Sheet 1
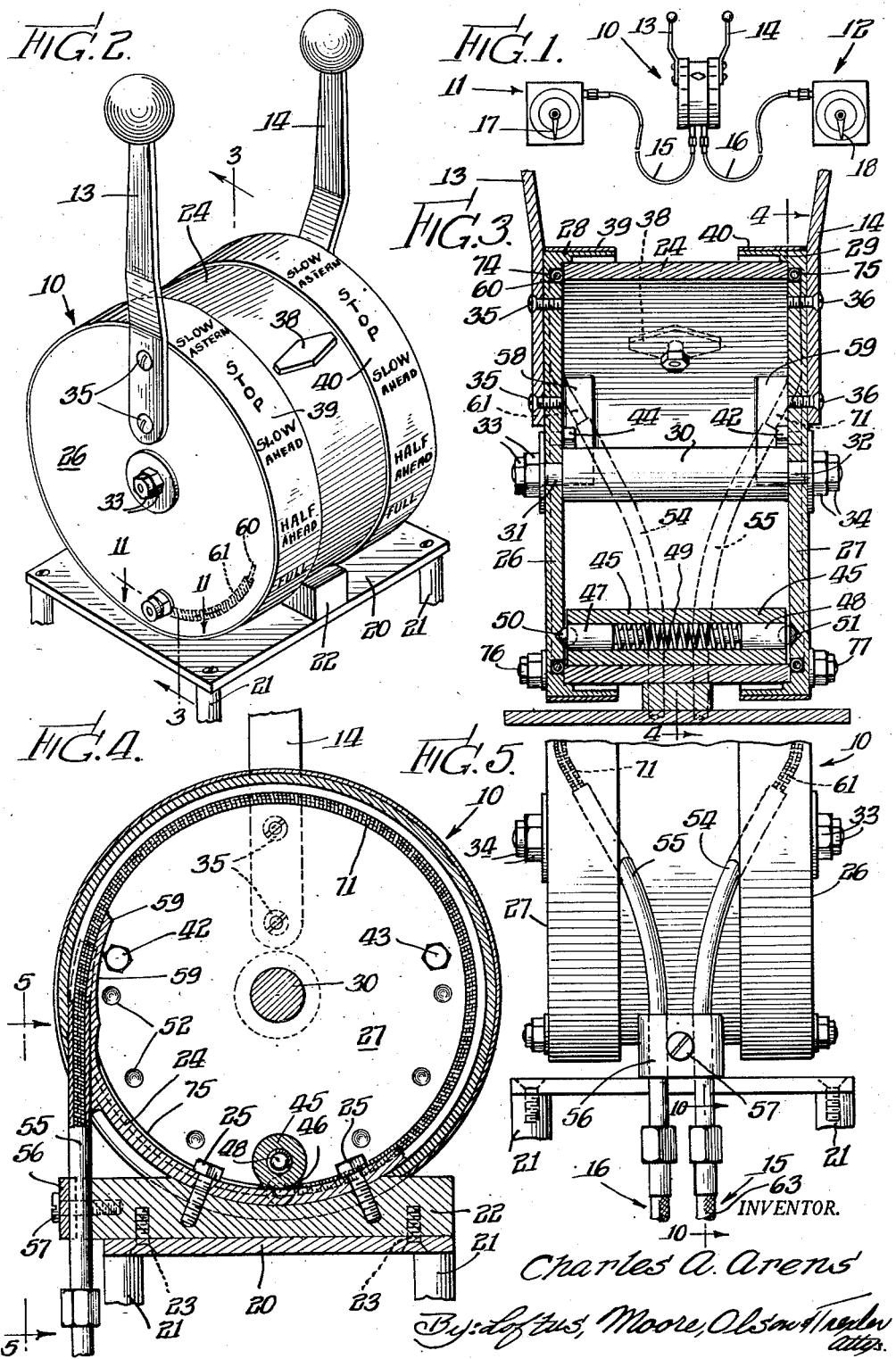
INVENTOR.
Charles A. Arens Sept. 7, 1948. C. A. ARENS 2,448,696
CONTROL UNIT
Filed May 17, 1943 2 Sheets-Sheet 2
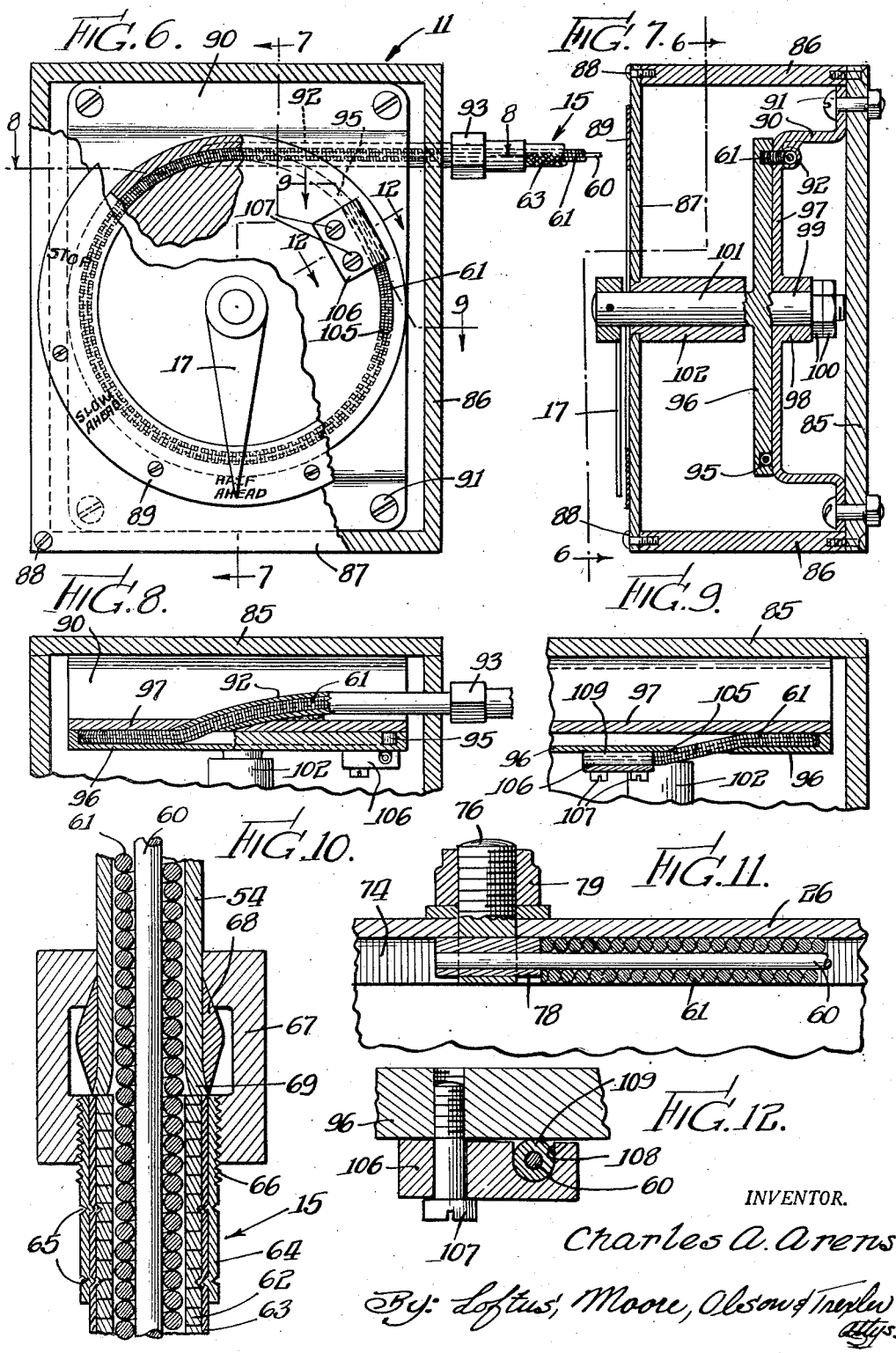
INVENTOR.
Charles A. Arens
By: Loftus, Moore, Olson & Trexler
attys.

Patented Sept. 7, 1948

2,448,696

UNITED STATES PATENT OFFICE 2,448,696

CONTROL UNIT

Charles A. Arens, Chicago, Ill., assignor to Arens Controls, Inc., Chicago, Ill., a corporation of Illinois Application May 17, 1943, Serial No. 487,238

12 Claims. (Cl. 74—501)

This invention relates to mechanically operated control units of the type wherein a control member and a device to be operated in accordance with the positioning of the control member are interconnected by a mechanical transmission structure, specifically an elongated transmission cable in the particular embodiment disclosed.

It is an object of the invention to provide a mechanical control unit of the type defined which may be readily fabricated and which is of improved construction and operating characteristics.

More specifically, it is an object of the present invention to provide a mechanical control unit of the type defined of simplified structure and accuracy of operation, and wherein frictional forces tending to resist operation of the parts are minimized and are rendered substantially uniform under all conditions of operation and manipulation of the control member.

A further object of the invention is to provide an improved mechanical control unit adapted for use with a flexible cable transmission structure.

Another object of the invention is to provide a mechanical control unit of the character defined, which in certain aspects is particularly adapted to effect dual control.

A still further object of the invention is to provide an improved indicator unit of the type having a manually actuated control structure, and one or more remotely positioned indicators operated thereby in accordance with the positioning of the control member or members of the control structure.

Various other objects, advantages and features of the invention will be apparent from the following specification when taken in connection with the accompanying drawings, wherein a preferred embodiment of the invention is set forth for purposes of illustration.

In the drawings, wherein like reference numerals refer to like parts throughout:

Fig. 1 is a general assembly view, diagrammatic in form, of a control unit constructed in accordance with and embodying the principles of the invention;

Fig. 2 is a perspective view, on an enlarged scale, of the manually operated control structure, as embodied in the assembly or unit illustrated in Fig. 1;

Fig. 3 is a vertical longitudinal sectional view of the structure of Fig. 2, on the line 3—3 thereof;

Fig. 4 is a transverse sectional view of the structure of Fig. 1 taken as indicated on the line 4—4 of Fig. 3; and Fig. 5 is a partial rear view of the same structure, taken as indicated on the line 5—5 of Fig. 4;

Fig. 6 is a detail view, partly in section, and taken as indicated by the line 6—6 of Fig. 7, of the operated device or indicator structure, embodied in the installation of Fig. 1;

Fig. 7 is a vertical sectional view of the device of Fig. 6, on the line 7—7 thereof; and Figs. 8 and 9 are detail sectional views of the structure of Fig. 6 taken, respectively, as indicated on the lines 8—8 and 9—9;

Fig. 10 is a detail view, on a further enlarged scale, of one of the end connections for the transmission cable sheath, and taken specifically as indicated by the line 10—10 of Fig. 5;

Fig. 11 is a detail view illustrating the manner of anchoring one end of the transmission cable to its manually operable control member, and taken as indicated by the line 11—11 of Fig. 2; and Fig. 12 is a detail view showing the manner of anchoring the other end of the transmission cable to the operated device or indicator, and taken as indicated on the line 12—12 of Fig. 6.

The structure specifically set forth in the drawings, for illustrative purposes, comprises an indicator installation or unit of the type utilized on ships, aircraft, or other vehicles in connection with their operation and control, and certain of the features of the invention are particularly adapted to a structure of this type. It is to be understood, however, that various features of the invention are adapted for use in mechanical control units generally, including other forms of indicators as well as other types of operated or control units wherein an operated member is to be actuated in accordance with the operation or positioning of an operating control member.

Referring more specifically to the drawings, in Fig. 1 an indicator unit or installation is illustrated comprising a manually actuated control structure, generally indicated by the numeral 10, and a pair of indicators operated thereby, generally indicated by the numerals 11 and 12. The control structure 10 includes a pair of manually operable control members or handles 13 and 14, connected, respectively, to the operated devices 11 and 12, by means of elongated transmission cables 15 and 16. The details of the transmission cables will be later described, suffice to say that each includes an inner or shiftable actuating structure, connected to the handles 13 and 14 and adapted for push-pull actuation within a flexible sheath. The operated device or indicator 11 includes an indicator member 17, whereas the operated device or indicator 12 includes an indicator member 18, these indicator members being connected, respectively, to the inner or shiftable actuating structures of the transmission cables. It will be seen that as the control member or handle 13 is operated, corresponding positioning will be imparted to the indicator pointer 17 of the controlled device 11, whereas operation of the control handle 14 imparts corresponding increments of movement and positioning to the indicator pointer 18 of the controlled device 12.

The details of construction of the control structure 10 are shown in Figs. 2, 3, 4, 5, 10 and 11. Referring to Figs. 2 to 5 inclusive, it will be seen that this structure comprises a base or platform 20 supported by legs 21. The base 20 carries a block member 22 extending across the base and secured thereto by suitable means such as screws 23, Fig. 4. This block in turn forms the support for a barrel or main frame member 24, secured to the block by a pair of screws 25. The main frame member 24 is thus fixed to the base or platform 20, and is in effect integral therewith. In form, the frame member 24 comprises a cylinder open at both ends.

The ends of the cylinder are closed by a pair of circular end plates 26 and 27, which end plates are rotatably mounted upon the cylinder ends. To guide the plates in their rotatable movements, they are provided with axially directed peripheral flanges, as indicated at 28 and 29, Fig. 3, these flanges having bearing engagement with the outer cylindrical surface of the barrel frame 24. A lug 30 is arranged within the barrel frame 24, between the end plates, and provided with extensions 31 and 32 projecting through central openings in the plates. These extensions are threaded, and carry pairs of lock nuts 33 and 34 for holding the plates in position. These lock nuts are adjusted so that the plates 26 and 27 are independently rotatable relative to the main frame 24.

The handles 13 and 14 are secured, respectively, to the plates 26 and 27, by suitable means such as screws 35 and 36, so that the handles serve as means for effecting the rotational movements of the plates. The barrel frame 24 carries an indicator pointer 38, Fig. 1, which cooperates with a pair of indicator bands 39 and 40 mounted, respectively, on the plate flanges 28 and 29. The indicators 38, 39, 40 show the adjusted positioning of the plates, as they are rotated by their respective handles.

The plate 27 carries a pair of screws 42 and 43, Fig. 4, and the plate 26 carries a similar pair of screws, one of which is indicated at 44 in Fig. 3. These screws, upon rotation of the end plates, are adapted to be brought into engagement with a cylindrical stop lug 45 extending between the plates and secured to the lower portion of the main frame 24 by suitable means such as welding or soldering as indicated at 46, Fig. 4. The engagement of the screws with the stop lug serves as a limiting means for the rotational movements of the plates. The stop lug 45 is provided with a central bore adapted to carry a pair of plungers 47 and 48 urged outwardly by means of a compression spring 49. These plungers cause balls 50 and 51 mounted, respectively, in the ends of the plungers, to be urged against the surfaces of the plates, for cooperation with a series of depressions 52, Fig. 4, in the plates. These depressions serve as positioning devices for the plates, and are so spaced that when in engagement with the balls the various designations on the indicator bands 39 and 40 are in proper aligned cooperation with the indicator pointer 38 of the frame.

A pair of fixed tubes 54 and 55 are provided, the tubes being firmly clamped adjacent their lower ends against the frame block 22 by means of a clamp 56 held in place by a screw 57, Figs. 4 and 5. The upper ends of the tubes diverge away from each other and are imbedded into the wall of the barrel frame member 24, the barrel frame being provided with portions of increased wall thickness as indicated at 58 and 59 to accommodate the body of the tubes.

These tubes are adapted to slidably receive the inner or shiftable actuating portions of the transmission cables 15 and 16. Referring to Fig. 10, illustrating the structural details of the transmission cable 15 and its associated connection with the tube 54, it will be seen that the inner or shiftable actuating structure of the cable, in the specific embodiment illustrated, comprises a central core wire 60 embraced within and movable as a unit with a wire coil 61. The ends of the wire coil 61 are secured to the core wire 60, and in operation, the wires 60 and 61 form a composite inner or shiftable actuating transmission cable structure, shiftable as a unit within the tube 54. The core wire 60 may be adapted primarily to absorb tensile stresses whereas the coil wire 61 primarily absorbs compressive stresses, in the push-pull movements of the cable. The transmission cable also includes a sheath wire coil 62, Fig. 10, within which the inner or actuating structure of the cable is shiftable, the sheath coil 62 preferably being encased within a covering 63 of suitable protective material such as rubber, fabric, or the like. The wire coil 62 with its covering 63 forms a flexible sheath for the actuating cable 60, 61.

Referring further to Fig. 10, to secure the cable sheath 62 firmly to the end of the tube 54, the sheath at its end is provided with a sleeve fitting 64, anchored to the sheath end by suitable means, such for example as punched indentations, as indicated at 65. The end of the fitting 64 is provided with screw threads 66 adapted for cooperation with an internally threaded bore provided at one end of a coupling member 67. The other end of the coupling member is shaped for cooperation with a tapered sleeve 68 anchored upon the end of the tube 54, the tube end being slightly flared as indicated at 69 to hold the sleeve 68 in position. It will be seen that as the coupling member 67 is rotated relative to the fitting 64, a tight abutting connection between the cable sheath 62 and the tube 54 is provided.

The cable 16 may be similar in structure to the cable 15, and anchored to the end of the tube 55 by similar means. In Fig. 5 the shiftable cable portion of the cable 16, corresponding to the coil 61 of the cable 15, is indicated by the reference numeral 71.

The shiftable cable elements 60, 61 are directed from the upper end of the tube 54 into a groove or channel 74 extending peripherally of the plate 26, the shiftable cable elements of the cable 16 being similarly directed by the upper end of the tube 55 into a groove or channel 75 extending peripherally of the plate 27. When the rotatable plates 26 and 27 are in normal position, as shown in Fig. 2, the cables extend along a length of approximately 270 degrees within the grooves 74 and 75, extending lesser or greater extents, as the plates are rotated. The cable ends are anchored, respectively, to the plates, and within the plate grooves, by anchor bolts 76 and 77, which may be of similar construction, the details of the anchor bolt 76 being illustrated in Fig. 11.

Referring to Fig. 11, it will be seen that the core wire 60 has fixed to its end, and in abutting engagement with the wire coil 61, an eccentrically apertured bushing or fitting 78 secured to the end of the core wire 60 by suitable means such as soldering, swedging or the like. The anchor bolt 76 is apertured at its inner end to receive the fitting 78, and the outer end of the bolt is threaded for cooperation with a nut 79. It will be seen that as the nut is rotated, the bolt 76 may be drawn outwardly whereby to cause it to tightly grip the fitting 78 and thus anchor the cable structure 60—61 in position, to the plate 26, and within its groove 74.

In operation, it will be seen that as the plates 26 and 27 are actuated, respectively, by their handles 13 and 14, the inner or actuating structures of the cables are shifted within the tubes 54 and 55, and within the cable sheaths.

Referring to Figs. 6, 7, 8, 9 and 12, showing the details of the indicator structure operated by the cable 15, it will be seen that the indicator comprises a main frame formed of a base 85 and side walls 86. A face plate 87 overlies the side walls 86, being secured thereto by means such as screws 88. This face plate carries a dial 89 with which the indicator pointer 17 cooperates.

A frame bracket 90 is fixed to the base 85 by bolts 91. This frame bracket rigidly carries a tube 92 having a function and purpose similar to the tubes 54 and 55 previously described. More specifically, the outer end of the tube projects through one of the side walls 86, and is adapted by means of a coupling connection 93 to be connected with the end of the transmission cable sheath. This coupling connection may be the same as the coupling connection previously described, and illustrated in detail in Fig. 10.

The inner end of the tube 92 directs the shiftable cable elements 60—61 into an annular groove 95 formed peripherally within a rotatable plate 96, said plate being adapted for rotation upon the face or table portion 97 of the bracket 90. The central portion of the bracket is formed as a bushing 98 through which a projection 99 of the plate 96 extends. This projection is threaded on its end, and adapted to receive a pair of lock nuts 100 whereby the plate is secured to the bracket, but for free rotation thereon. The plate 96 is also provided with an oppositely extending projection 101 to the end of which the pointer 17 is pinned. A bearing 102 is secured to the face plate 87, forming a journal for the projection 101.

One portion of the rotatable plate 96 is provided with an opening 105, Figs. 6 and 9, projecting from the groove 95 angularly through the outer face wall of the plate 96. The end of the cable 60, 61 projects from the groove 95 through this opening 105, the cable end then being anchored onto the face of the plate by means of an anchor bracket 106, Figs. 6, 9 and 12, held in position by screws 107. As best shown in Fig. 12, the groove 108 in the bracket 106 is slightly smaller than the sleeve 109 secured to the cable end, so that as the bolts 107 are tightened, the cable end will be clamped between the bracket and the face of the plate 96, and securely held in place.

In operation, it will be seen that as the transmission cable 60, 61 is projected or retracted through the cable sheath and through the tube 92, the plate 96 will be caused to rotate on the bracket 90, moving the pointer 17 to its various shifted positions. Due to the manner in which the cable is projected by the tube 92 at an angle into the plate groove 95, and then directed at substantially the same angle from the groove through the opening 105, it will be seen that the plate 96 may experience substantially 360 degrees rotation, under the push-pull actuations of the transmission cable.

Particular attention is directed to the manner of cooperation between the shiftable elements of the transmission cables, and the grooves 95 and 74 and 75, as provided in the operating elements of the structures. It will be seen that as the handle 13 is actuated to impart a pushing propulsion to its associated transmission cable, the cable expands into contact with the outer wall of the groove 74, but there is no sliding frictional contact between the cable and the groove. The only possible sliding contact is between the cable and the end surface of the frame barrel 24, which contact is inconsequential in so far as concerns friction because there is no pressure engagement; and between the sliding cable and the tube 54 and the cable sheath 62. Similarly when the handle 13 is manipulated to effect a pulling action upon the cable, the cable is contracted into gripping engagement with the inner wall of the groove 74. But again there is no friction inducing sliding contact between the parts, the only points of sliding contact and frictional engagement being the same as when the cable is pulled. Accordingly not only is frictional resistance to movement minimized, but such frictional resistance as is encountered is substantially equal during both pulling and pushing movements, and is also substantially constant regardless of how much of the cable length lies within the plate slot 74. Similar operations occur in the action of the plate 27, and in the operated indicator devices, as in the case of the plate 96.

Accordingly it will be seen that the frictional resistance to movement is minimized, and such frictional resistance as is encountered, is uniform on both pushing and pulling movements, and during the entire stroke of operation, regardless of the particular handle position. A dual control unit, adapted for use with a flexible transmission cable having minimum backlash and maximum accuracy is provided.

It is obvious that various changes may be made in the specific embodiment set forth for purposes of illustration without departing from the spirit of the invention. Accordingly the invention is not to be limited to the embodiment shown and described, but only as indicated in the following claims.

The invention is hereby claimed as follows:

1. A control unit comprising a frame, a control member pivotally mounted on said frame, said control member having a cylindrical indicator portion extending radially beyond and over the frame, and a transmission member connected at one end to said pivoted control member and adapted to be connected at its other end to a device to be controlled, said control member having a groove receiving the transmission member and within which the transmission member is maintained by a portion of the frame, said transmission member being axially shiftable by the operation of the pivoted control member, and said transmission member during its axial shifting in a given direction having uniform areas of contact with said frame.

2. A control unit comprising a frame, a control member pivotally mounted on said frame, said control member having an annular flange portion embracing and having bearing engagement with the frame, and a transmission member connected at one end to said pivoted control member and adapted to be connected at its other end to a device to be controlled, said control member having a groove receiving the transmission member and within which the transmission member is maintained by a portion of the frame, said transmission member being axially shiftable by the operation of the pivoted control member, and said transmission member during its axial shifting in one direction having substantially the same contact areas with said frame as during axial shifting in the opposite direction.

3. A control unit comprising a frame, a control member pivotally mounted on said frame, said control member being provided with an arcuate groove, an elongated transmission member connected at one end to said pivoted control member and adapted to be connected at its other end to a device to be controlled, said transmission member being axially shiftable by the operation of the pivoted control member and being adapted to lie within said groove, and said transmission member being expansible against an outer wall of said groove during movement of the control member in one direction and being contracted against an inner wall of said groove during movement of the control member in the opposite direction, and means for connecting the transmission member to the control member comprising an anchor member projecting through the control member into said groove and having an opening receiving the transmission member end.

4. A control unit comprising a frame, a control member pivotally mounted on said frame, said control member being provided with an arcuate groove, an elongated transmission member connected at one end to said pivoted control member and adapted to be connected at its other end to a device to be controlled, said transmission member being axially shiftable by the operation of the pivoted control member and being adapted to lie within said groove, means on said frame for directing the transmission member into the groove at an acute angle from the open side of the groove, and an annular flange portion on the control member embracing and having bearing engagement with the frame radially outwardly of the groove.

5. A control unit comprising a frame, a control member pivotally mounted on said frame, said control member being provided with an arcuate groove, an elongated transmission member connected at one end to said pivoted control member and adapted to be connected at its other end to a device to be controlled, said transmission member being axially shiftable by the operation of the pivoted control member and being adapted to lie within said groove, means on said frame for directing the transmission member into the groove at an acute angle from the open side thereof and along a plane extending tangentially from said arcuate groove, and means for connecting the transmission member to the control member comprising an anchor member projecting through the control member into said groove and having an opening receiving the transmission member end.

6. A control unit comprising a frame, a control member pivotally mounted on said frame, said control member being provided with an arcuate groove, an elongated transmission member connected at one end to said pivoted control member and adapted to be connected at its other end to a device to be operated therewith, said transmission member being axially shiftable by the operation of the pivoted control member and being adapted to lie within said groove, means on said frame for directing the transmission member into said groove at a given acute angle from the open side of the groove, the end of said cable being directed at substantially the same acute angle from the groove through an opening associated therewith and extending through a closed wall of the groove, said end being secured to said pivoted control member.

7. A control unit comprising a hollow cylindrical frame, a manually operable control member pivotally mounted on said frame, said control member comprising a plate having an axially directed annular flange adapted for bearing engagement with an outer annular surface of the frame, a control handle connected to said plate, and a transmission cable structure, said transmission cable structure including a sheath connected to said frame and an inner actuating member slidable within said sheath and connected to said pivoted control member, a portion of said actuating member lying within an arcuate groove formed into the side wall of the plate.

8. A control unit comprising a hollow cylindrical frame, a pair of manually operable control members pivotally mounted on said frame, said control members comprising a pair of plates closing the opposite ends of the cylindrical frame and having cylindrically extending flanges adapted for bearing engagement with cylindrical surfaces of the frame, control handles connected to said plates, and transmission cable structures, said transmission cable structures including sheaths connected to said frame and inner actuating members slidable, respectively, within said sheaths and connected to said pivoted control members, portions of said actuating members lying within arcuate grooves formed into the side walls of said plates.

9. A control unit comprising a hollow cylindrical frame, a manually operable control member pivotally mounted on said frame, said control member comprising a plate having an axially directed annular flange adapted for bearing engagement with an annular surface of the frame, stop means within the frame for limiting the pivotal movements of the plate, means within the frame for releasably holding the plate in various positions within its range of movement, a control handle connected to said plate, and a transmission cable structure, said transmission cable structure including a sheath connected to said frame and an inner actuating member slidable within said sheath and connected to said pivoted control member, a portion of said actuating member lying within an arcuate groove formed into the side wall of the plate.

10. A control unit comprising a cylindrical frame, a manually operable control member pivotally mounted on said frame, said control member comprising a plate having an axially directed annular flange adapted for bearing engagement with an outer annular surface of the frame, indicating indicia arranged on said annular flange, cooperating indicia arranged on the cylindrical frame, a control handle connected to said plate, a transmission cable structure, said transmission cable structure including a sheath connected to said frame and an inner actuating member slidable within the sheath and connected at one end to said pivoted control member, a portion of said actuating member lying within an arcuate groove formed into the side wall of the plate, and an indicator device connected to the other end of said transmission cable actuating member.

11. A control unit comprising a hollow cylindrical frame, a manually operable control member pivotally mounted on said frame, said control member comprising a plate having a cylindrically extending flange adapted for bearing engagement with the outer cylindrical surface of said frame, said plate side wall being provided with an arcuate groove the open side of which is closed by the annular end surface of said cylindrical frame, an elongated transmission cable connected at one end to said pivoted control member and adapted to be connected at its other end to a device to be controlled, said transmission member being axially shiftable by the operation of the pivoted control member and being adapted to lie within said groove, and a conduit formed in said frame and adapted to direct the transmission cable into said groove at an acute angle from the open side of the groove.

12. A control unit comprising a frame, a control member pivotally mounted on said frame, said control member being provided with an arcuate groove, the open face of which is closed by a surface of said frame, an elongated transmission member connected at one end to said pivoted control member and adapted to be connected at its other end to a device to be operated therewith, said transmission member being axially shiftable by the operation of the pivoted control member and being adapted to lie within said groove, a passage within said frame through which the transmission member is directed into said groove from the open side thereof, and a passage in the control member extending at an acute angle from the groove for receiving and anchoring the transmission member end, said passages being comating to effect a nested relationship of the parts.

CHARLES A. ARENS.

REFERENCES CITED

The following references are of record in the file of this patent:

UNITED STATES PATENTS

| Number | Name | Date |
|---|---|---|
| D. 132,723 | Panish | June 9, 1942 |
| 1,076,870 | Dahl | Oct. 28, 1913 |
| 1,100,482 | Herzmark | June 16, 1914 |
| 1,223,316 | Curtiss | Apr. 17, 1917 |
| 2,071,383 | Barrett et al. | Feb. 23, 1937 |
| 2,326,796 | Panish | Aug. 17, 1943 |
| 2,358,094 | Panish | Sept. 12, 1944 |

FOREIGN PATENTS

| Number | Country | Date |
|---|---|---|
| 10,650 | Great Britain | 1914 |
| 10,651 | Great Britain | 1914 |
| 293,915 | Great Britain | July 19, 1928 |
| 353,542 | Great Britain | July 30, 1931 |
| 485,925 | Germany | Nov. 6, 1929 |
| 746,304 | France | May 26, 1933 |